(12) United States Patent
Earnshaw

(10) Patent No.: US 11,809,316 B2
(45) Date of Patent: Nov. 7, 2023

(54) SPECULATION-RESTRICTED MEMORY REGION TYPE

(71) Applicant: Arm Limited, Cambridge (GB)

(72) Inventor: Richard William Earnshaw, Cambridge (GB)

(73) Assignee: Arm Limited, Cambridge (GB)

( * ) Notice: Subject to any disclaimer, the term of this patent is extended or adjusted under 35 U.S.C. 154(b) by 55 days.

(21) Appl. No.: 17/052,701

(22) PCT Filed: May 9, 2019

(86) PCT No.: PCT/GB2019/051277
§ 371 (c)(1),
(2) Date: Nov. 3, 2020

(87) PCT Pub. No.: WO2019/229414
PCT Pub. Date: Dec. 5, 2019

(65) Prior Publication Data
US 2021/0240619 A1 Aug. 5, 2021

(30) Foreign Application Priority Data

Jun. 1, 2018 (GB) .................................... 1809043

(51) Int. Cl.
*G06F 12/0802* (2016.01)
*G06F 12/14* (2006.01)

(52) U.S. Cl.
CPC ........ *G06F 12/0802* (2013.01); *G06F 12/145* (2013.01); *G06F 2212/507* (2013.01); *G06F 2212/60* (2013.01)

(58) Field of Classification Search
None
See application file for complete search history.

(56) References Cited

U.S. PATENT DOCUMENTS 5,864,692 A 1/1999 Faraboschi et al.
5,983,306 A 11/1999 Corrigan et al.
(Continued)

FOREIGN PATENT DOCUMENTS

WO 2017/052595 3/2017

OTHER PUBLICATIONS

International Search Report for PCT/GB2019/051277 dated Jul. 29, 2019, 4 pages.
(Continued)

*Primary Examiner* — Stephanie Wu
(74) *Attorney, Agent, or Firm* — NIXON & VANDERHYE P.C.

(57) ABSTRACT

An apparatus has processing circuitry (18), and memory access circuitry (35) to control access to a memory system based on memory attribute data identifying each memory region as one of a plurality of region types. A speculation-restricted region type is supported, for which: at least when a first read request is non-speculatively issued to a region of the speculation-restricted type, a subsequent read request is permitted to be serviced using data obtained in response to the first read request; and for a speculatively issued read request to the region of the speculation-restricted type, at least when caching the read data would require allocation of a new entry in the cache, at least one response action, which is permitted for non-speculatively issued read requests specifying a target memory region of the speculation-restricted region type, may be prohibited from being performed before the first read request has been resolved as correct.

24 Claims, 5 Drawing Sheets

| | | Normal | Speculation-Restricted | | | Device | |
|---|---|---|---|---|---|---|---|
| | | | Speculative and not yet resolved as correct | Non-speculative | | Speculative | Non-speculative |
| 1) | Issue read transaction to memory system | Yes | | Yes | | No | Yes |
| 2) | Return data obtained from memory to the processor | Yes | At least one of these actions is not permitted OR At least one of these actions is not permitted when there is no existing entry in L1 cache for target address, but is permitted when there is already an entry in L1 cache for target address | Yes | | No | Yes |
| 3) | Allocate read data to L1 cache | Yes | | Yes | | No | No |
| 4) | Trigger change in address allocation in remote cache | Yes | No | Yes | | No | Yes |
| 5) | Cause unopened DRAM page to be opened | Yes | No | Yes | | No | Yes |
| 6) | Allow subsequent read request to be serviced using data obtained in response to first read request | Yes | Yes | Yes | | No | No |
| 7) | Duration of caching | Unlimited | Option for some embodiments: Limited duration | | | No caching | No caching |
| 8) | Prefetch requests allowed? | Yes | No OR allowed only when data corresponding to immediately preceding memory region already cached non-speculatively | N/A (prefetch always speculative) | | No | N/A |

(56) References Cited

U.S. PATENT DOCUMENTS

| | | | |
|---|---|---|---|
| 2005/0013183 A1 | 1/2005 | Southwell | |
| 2008/0244192 A1* | 10/2008 | Uchiyama | G06F 12/0831 711/E12.001 |
| 2009/0319730 A1* | 12/2009 | Tanaka | G06F 13/4243 711/E12.001 |
| 2012/0311267 A1* | 12/2012 | Gaither | G06F 12/128 711/E12.024 |
| 2014/0052956 A1* | 2/2014 | Moll | G06F 12/0215 711/205 |
| 2014/0189261 A1* | 7/2014 | Hildesheim | G06F 12/1027 711/152 |
| 2014/0208039 A1* | 7/2014 | Gilbert | G06F 9/383 711/137 |
| 2014/0380009 A1* | 12/2014 | Lemay | G06F 9/45558 711/163 |
| 2015/0278099 A1* | 10/2015 | Jain | G06F 12/0862 711/137 |
| 2016/0283232 A1 | 9/2016 | Sade et al. | |
| 2018/0253384 A1* | 9/2018 | Li | G06F 12/0804 |
| 2019/0042447 A1* | 2/2019 | Sukhomlinov | G06F 21/556 |
| 2019/0042747 A1* | 2/2019 | Sukhomlinov | G06F 21/6218 |
| 2019/0377575 A1* | 12/2019 | Maruyama | G06F 9/3016 |

OTHER PUBLICATIONS

Written Opinion of the ISA for PCT/GB2019/051277 dated Jul. 29, 2019, 8 pages.

Lehman et al., "PoisonIvy: Safe speculation for secure memory", 2016 49th Annual IEEE/ACM International Symposium on Microarchitecture (MICRO), Oct. 15, 2016, 13 pages.

Combined Search and Examination Report for GB 1809043.1, dated Nov. 30, 2018, 6 pages.

Arm, "Cache Speculation Side-channels", Whitepaper, Feb. 2018, Version 1.2, 13 pages.

Office Action for JP Application No. 2020-565370 dated Jun. 9, 2023 and English translation, 12 pages.

* cited by examiner type field : 00  Normal (non-speculation-restricted)
           01  Device
           10  Speculation-restricted
           11  Reserved

| type field | global attribute | type |
|---|---|---|
| 0 | 0 | Normal |
| 0 | 1 | Speculation-restricted |
| 1 | 0 | Device |
| 1 | 1 | Reserved |

50

| | | Normal | Speculation-Restricted | | Device | |
|---|---|---|---|---|---|---|
| | | | Speculative and not yet resolved as correct | Non-speculative | Speculative | Non-speculative |
| 1) | Issue read transaction to memory system | Yes | | Yes | No | Yes |
| 2) | Return data obtained from memory to the processor | Yes | At least one of these actions is not permitted OR At least one of these actions is not permitted when there is no existing entry in L1 cache for target address, but is permitted when there is already an entry in L1 cache for target address | Yes | No | Yes |
| 3) | Allocate read data to L1 cache | Yes | | Yes | No | No |
| 4) | Trigger change in address allocation in remote cache | Yes | No | Yes | No | Yes |
| 5) | Cause unopened DRAM page to be opened | Yes | No | Yes | No | Yes |
| 6) | Allow subsequent read request to be serviced using data obtained in response to first read request | Yes | Yes | Yes | No | No |
| 7) | Duration of caching | Unlimited | Option for some embodiments: Limited duration | | No caching | No caching |
| 8) | Prefetch requests allowed? | Yes | No OR allowed only when data corresponding to immediately preceding memory region already cached non-speculatively | N/A (prefetch always speculative) | No | N/A |

FIG. 5

SPECULATION-RESTRICTED MEMORY REGION TYPE

CROSS-REFERENCE TO RELATED APPLICATIONS

This application is the U.S. national phase of International Application No. PCT/GB2019/051277 filed May 9, 2019 which designated the U.S. and claims priority to GB1809043.1 filed Jun. 1, 2018, the entire contents of each of which are hereby incorporated by reference.

The present technique relates to the field of data processing.

A data processing apparatus may support speculative execution of instructions, in which instructions are executed before it is known whether input operands for the instruction are correct or whether the instruction needs to be executed at all. For example, a processing apparatus may have a branch predictor for predicting outcomes of branch instructions so that subsequent instructions can be fetched, decoded and executed speculatively before it is known what the real outcome of the branch should be. Also some systems may support load speculation where the value loaded from memory is predicted before the real value is actually returned from the memory, to allow subsequent instructions to be processed faster. Other forms of speculation are also possible.

At least some examples provide an apparatus comprising: processing circuitry capable of speculatively issuing a read request to request that data is read from a target memory region of a memory system; and memory access circuitry to control access to the memory system based on memory attribute data identifying each memory region as one of a plurality of region types; in which: in response to a first read request for which the target memory region is indicated as a speculation-restricted region type by the memory attribute data: at least when the first read request is non-speculatively issued by the processing circuitry, the memory access circuitry is configured to permit a subsequent read request to be serviced using data obtained in response to the first read request; and when the first read request is speculatively issued by the processing circuitry, at least when storage of data obtained in response to the first read request in a cache of the processing circuitry would require allocation of a new entry in the cache, the memory access circuitry is configured to prohibit at least one response action, which is permitted for non-speculatively issued read requests specifying a target memory region of the speculation-restricted region type, from being performed before the processing circuitry has resolved whether the first read request is correct.

At least some examples provide a method for a data processing apparatus comprising processing circuitry capable of speculatively issuing a read request to request that data is read from a target memory region of a memory system; the method comprising: controlling access to the memory system based on memory attribute data identifying each memory region as one of a plurality of region types; and in response to a first read request for which the target memory region is indicated as a speculation-restricted region type by the memory attribute data: at least when the first read request is non-speculatively issued by the processing circuitry, permitting a subsequent read request to be serviced using data obtained in response to the first read request; and when the first read request is speculatively issued by the processing circuitry, at least when storage of data obtained in response to the first read request in a cache of the processing circuitry would require allocation of a new entry in the cache, prohibiting at least one response action, which is permitted for non-speculatively issued read requests specifying a target memory region of the speculation-restricted region type, from being performed before the processing circuitry has resolved whether the first read request is correct.

At least some examples provide a method for memory allocation for a data processing apparatus, comprising: allocating one or more regions of memory for use by a given software process; and for each allocated region, selecting a selected region type from among a plurality of region types, and storing memory attribute data identifying the selected region type; in which: for at least one region, the selected region type comprises a speculation-restricted region type indicating that, in response to a first read request requesting that data is read from said at least one region, the data processing apparatus is to: at least when the first read request is non-speculatively issued by the data processing apparatus, permit a subsequent read request to be serviced using data obtained in response to the first read request; and when the first read request is speculatively issued by the data processing apparatus, at least when storage of data obtained in response to the first read request in a cache of the data processing apparatus would require allocation of a new entry in the cache, prohibit at least one response action from being performed before the data processing apparatus has resolved whether the first read request is correct, where said at least one response action is permitted for non-speculatively issued read requests specifying a target memory region of the speculation-restricted region type.

At least some examples provide a computer program for controlling a host processing apparatus to perform the method for memory allocation described above. The computer program may be stored in a storage medium. The storage medium may be a non-transitory storage medium.

Further aspects, features and advantages of the present technique will be apparent from the following description of examples, which is to be read in conjunction with the accompanying drawings, in which:

FIG. 1 schematically illustrates an example of a data processing apparatus;

FIG. 5 is a table showing properties of normal, speculation-restricted and device memory region types;

Figure 1:
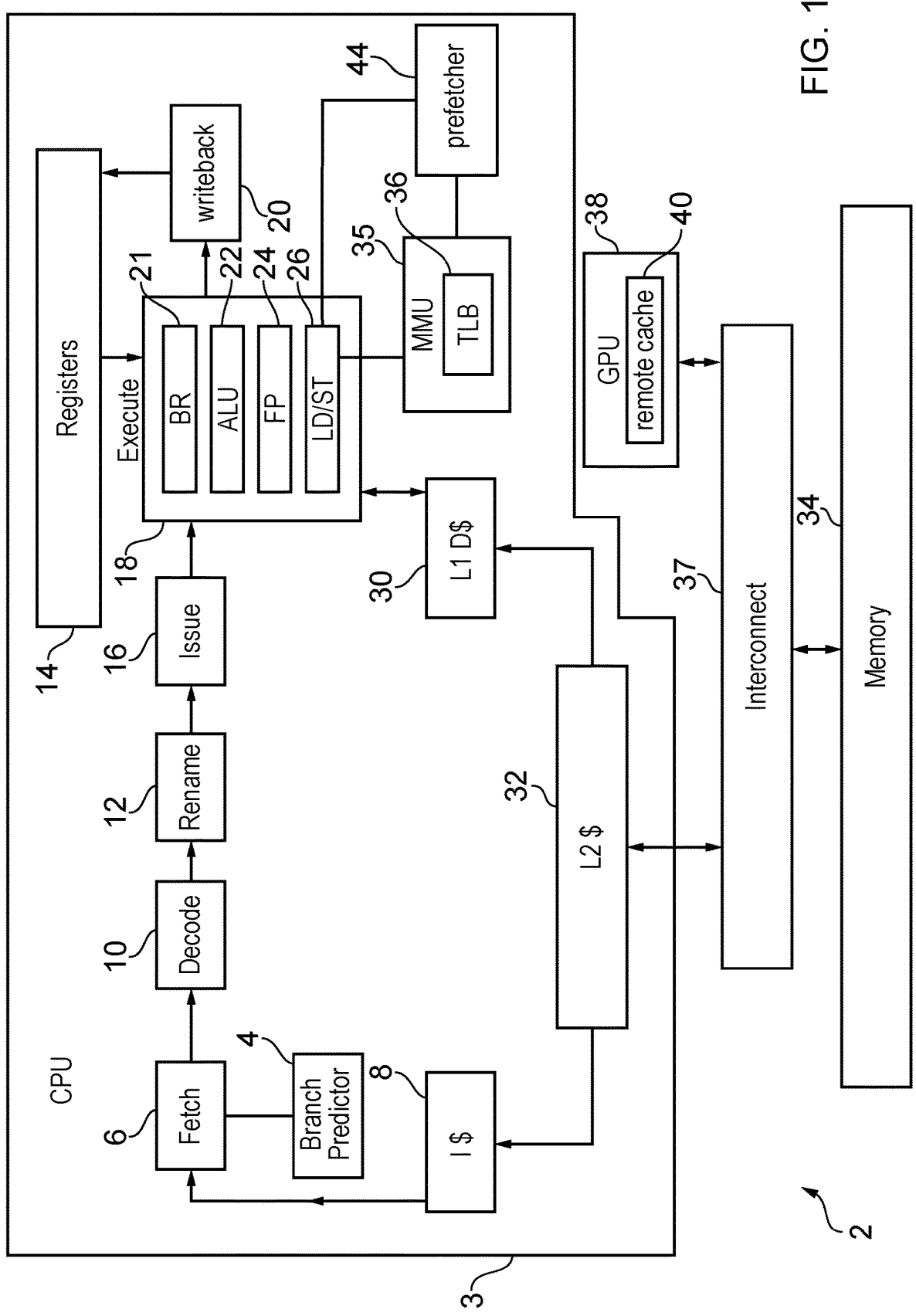

A data processing apparatus may have mechanisms for ensuring that some data in memory cannot be accessed by certain processes executing on the processing circuitry. For example privilege-based mechanisms and/or memory protection attributes may be used to control the access to certain regions of memory. Recently, it has been recognised that in systems using speculative execution and data caching, there is a potential for a malicious person to gain information from a region of memory that they do not have access to, by exploiting the property that the effects of speculatively executed instructions may persist in a data cache even after any architectural effects of the speculatively executed instructions have been reversed following a misspeculation. Such attacks may train branch predictors or other speculation mechanisms to trick more privileged code into speculatively executing a sequence of instructions designed to make the privileged code access a pattern of memory addresses dependent on sensitive information, so that less privileged code which does not have access to that sensitive information can use cache timing side-channels to probe which addresses have been allocated to, or evicted from, the cache by the more privileged code, to give some information which could allow the sensitive information to be deduced. Such attacks can be referred to as speculative side-channel attacks.

An apparatus has processing circuitry capable of speculatively issuing a read request to request the data is read from a target memory region of a memory system, and memory access circuitry to control access to the memory system based on memory attribute data identifying each memory region as one of a number of region types. The apparatus supports a speculation-restricted region type which can be indicated as one of the region types associated with corresponding regions of memory.

At least for a non-speculatively issued read request targeting a region of the speculation-restricted region type, subsequent read requests are permitted to be serviced using data obtained in response to the first read request. For example the data obtained in response to the first read request can be cached and subsequent read requests are allowed to hit against the cached data without needing to issue a second request to the memory system. This helps to improve performance by reducing the number of read requests which require a separate transaction to pass to the memory system.

On the other hand, for read requests which are speculatively issued by the processing circuitry, at least in cases where storage of data obtained in response to the first read request in a cache of the processing circuitry would require allocation of a new entry in the cache, at least one response action may be prohibited from being performed before the processing circuitry has resolved whether the first read request is correct. The prohibited response action may be an action which would be permitted for non-speculatively issued read requests specifying a target memory region of the speculation-restricted region type. This behaviour helps to protect against speculative side-channel attacks of the type discussed above. By defining a type of memory region which enables at least one response action to be prohibited in cases where servicing the read request could lead to an allocation of a new entry in the cache, this can provide greater security against such attacks. For example the regions of memory which are most at risk to such attacks (e.g. because they can contain sensitive data) could be designated as the speculation-restricted region type by the memory attribute data so as to restrict the manner in which speculative read requests can interact with such regions. Nevertheless, by enabling subsequent read requests to be serviced using data obtained in response to a read request for a speculation-restricted type of memory region, this avoids the loss of performance which would occur if subsequent read requests were prohibited from being serviced using data obtained in response to the first read request.

As discussed above, for regions of the speculation-restricted type the servicing of a subsequent read request using data obtained in response to the first read request may be permitted at least when the first read request is non-speculatively issued by the processing circuitry. In some implementations, the memory access circuitry may also permit a subsequent read request to be serviced using the data obtained in response to the first read request associated with the target memory region of the speculation-restricted region type when the first read request is speculatively issued by the processing circuitry and the processing circuitry has already resolved that the first read request was correctly issued.

In general, the at least one response action (which is prohibited for a read request to a speculation-restricted type of memory region at least when storage of data for the first read request would require allocation of a new entry in the cache) may be any type of response action which has the potential to cause an effect which is detectable through measuring cache access timings or memory system access timings. The speculation-side-channel attacks discussed above generally probe cache access timings or memory system access timings to detect information on addresses have been accessed even if the attacker does not actually have access to the data in the memory regions corresponding to those addresses. This can be used to deduce information about secret data not accessible to the attacker. By prohibiting, for speculatively issued read requests to the speculation-restricted region type when the data is not already in the cache, an action which could potentially change the cache access timings or memory system access timings to expose information on the addresses that were accessed, this provides greater security against such attacks.

More specifically, the at least one response action may comprise any of the following types of action:

Issuing a read transaction to the memory system in response to the read request from the processing circuitry. By preventing the read transaction being issued to the memory system at all, this prevents any data being returned from the memory system which could be allocated to a cache and hence change cache access timings, and also prevents any other effect of the transaction which could be visible through timings measured in another part of the memory system (such as a remote cache or DRAM unit).

Returning data obtained from the memory system in response to the read request to the processing circuitry. Hence with this example the transaction may still be issued to the memory system, but when data is returned this may be prevented from being passed to the processing circuitry so that it cannot be cached in the cache of the processing circuitry. This approach could help to improve performance by, for example, allowing data to be brought into a further level cache at a part of the memory system not directly visible to the processing circuitry until the data is brought into the processing circuitry's own cache, to reduce the latency of subsequent requests to the same address while still preventing the returned data being cached in the processing circuitry's own cache to mitigate against the attacks discussed above.

Allocating a new entry in the cache for storing data corresponding to the target memory region. Hence, with this approach while the data may be allowed to be returned to the processing circuitry speculatively, so that the instruction which triggered the read request (and potentially one or more subsequent instructions) may be processed using the data returned in response to the first read request (e.g. the data may be stored in a register for access by subsequent instructions), no new entry may be allocated in the cache for storing that data. This means again that there is no change in the cache allocation pattern which could be probed by an attacker to mount an attack as discussed above. Hence with this approach performance of the code executed on the processing circuitry may be improved relative to the other options.

Which of these options is selected as the response action may depend on the particular processor implementation. It will be appreciated that if the read transaction is prevented from being issued to the memory system then this may by definition also prevent the return of the data from the memory system and the allocation of a new entry in the cache for storing the return data. However, in systems where the read transaction is permitted to be issued to the memory system then it is implementation dependent whether either the data is prevented from being returned to the processing circuitry altogether or whether the data is allowed to be returned but any new entry in the cache is not allowed to be allocated.

In some embodiments, for a speculative read request targeting a memory region of the speculation-restricted region type, the at least one response action may be prohibited from being performed before the read request has been resolved as correct regardless of whether any entry has already been allocated in the processor's cache for storing data corresponding to the target memory region of the speculation-restricted region type. This approach can be simpler to implement as it is not necessary to check what addresses have already been cached in the processor's cache, when determining whether the at least one response action is allowed.

Alternatively, some implementations may check, for a speculatively issued read request to the speculation-restricted region type, whether an entry has already been allocated in the cache for storing data corresponding to the target memory region of the speculation-restricted region type, and when there is already such an entry in the cache, the memory access circuitry may allow the at least one response action to be performed before the processing circuitry has resolved whether the first read request is correct. This approach can allow improved performance by permitting actions which would not otherwise be permitted if the data had not already been cached. This recognises that often when data from a given address is already in the cache this may be an indication that the currently executing process is allowed to access that data and so there may be less of a risk of the speculation-side-channel attacks as discussed above. By permitting the response action for a subsequent request for an already cached address, even if that speculative request is not yet resolved, this can improve performance by avoiding the need to wait until the speculative access has been resolved as correct for performing this action.

Hence, it is optional whether there is actually a check of whether the cache already stores a relevant entry for the address targeted by the first read request for the speculation-restricted region type. At least when the data is not already cached so that storage of data in the cache would require allocation of a new entry in the cache, the at least one response action may be prohibited for the first read request targeting the speculation-restricted-region type of memory region. However it is optional whether the response action is permitted or prohibited for such a speculatively issued first read request when the data is already allocated to an entry in the cache.

Another example of a response action (which could be prohibited for requests issued speculatively to a memory region of the speculation-restricted region type) may be triggering a change in which addresses have data allocated in at least one remote cache of a master device other than the processing circuitry. A further example may comprise causing an unopened DRAM page of the memory system to be opened. Again, such actions could potentially expose information on secret data to an attacker because the opening of a previously unopened DRAM page or a change in which addresses are cached in a remote cache may result in differences in access timings to other addresses which could allow the attacker to deduce information on which address was accessed speculatively, which in some cases may expose information on the secret. Note that the change in address allocation in a remote cache and the opening of an unopened DRAM page may be prohibited for a speculatively issued read request to the speculation-restricted type of memory region regardless of whether or not the data associated with the address of the memory region of the speculation-restricted region type is already cached within the processing circuitry's own cache. The prohibition on remote cache changes or DRAM page opening could be achieved in different ways (e.g. by not issuing any read transaction to the memory system at all, or issuing a form of transaction which indicates that it can only be serviced if it would not cause a change in remote cache allocation and/or DRAM page opening).

The cache discussed above may be a level 1 cache of the processing circuitry. That is, the restriction of allocation of entries into the cache, and/or the consideration of whether an entry has already been allocated in the cache when determining whether the response action can be performed, may apply to the level 1 cache of the processing circuitry. If the processing circuitry has a level 2 cache or further level cache then caching of the data from the speculation-restricted region type into the level 2 or further level cache may be unrestricted and may be allowed regardless of whether the request is speculatively issued for memory regions of the speculation-restricted region type. This recognises that in many processing apparatus designs access to all data by the processing circuitry is performed through the level 1 cache and so if data is restricted from being cached in the level 1 cache, then even if it is present in the level 2 cache then this would not necessarily give access to the data in the level 2 cache to the processing circuitry. Hence, by permitting data to be brought into a level 2 cache or further level cache for speculatively issued read requests to the speculation-restricted region type, this is unlikely to cause a risk in terms of speculation-side-channel attacks, but may improve performance because once a request is resolved as correct then a non-speculative access may the pull data in from the level 2 cache into the level 1 cache faster than if the data had not been allowed to be placed in the level 2 cache at all. Hence, this approach can improve performance.

In the examples above, when the first read request is speculatively issued by the processing circuitry for a memory region indicated as the speculation-restricted region type, the at least one response action may be prohibited from being performed before the processing circuitry has resolved whether the first read request is correct. On the other hand, once the processing circuitry has already resolved the first read request which was speculatively issued is correct, it is optional whether or not that at least one response action is still prohibited or is allowed.

In some cases when the first read request is speculatively issued, at least in cases when storage of the data obtained in response to the read request would require allocation of a new entry in the cache, the memory access circuitry may prohibit the at least one response action being performed in response to the first read request even when the processing circuitry has resolved that the first read request is correct. This may simplify the memory access control logic by avoiding the need to consider the timing at which a speculatively issued request becomes resolved as correct and avoiding the need to track the outcome of previously considered requests. Instead, if the speculatively issued first read request is encountered then the at least one response action may be prohibited. If this results in the first read request failing then a fault indication may be returned and then this may for example trigger the processing circuitry to reissue the request non-speculatively once it is resolved that the request was correct. Hence, this approach can be more efficient to implement in terms of the memory access logic required.

In other embodiments, in cases where the at least one response action would have been prohibited if the processing circuitry has not yet resolved the first read request as correctly issued, the memory access circuitry may allow the at least one response action to be performed after the processing circuitry has already resolved that the first read request is correct. This may avoid the need for the processing circuitry to reissue the read request after resolving it as correct, since the memory access circuitry may detect this and then allow the response action to continue.

In some implementations, the memory access circuitry could simply reject all speculatively issued read requests for which the target memory region is of the speculation-restricted region type. Hence, this could avoid the need to provide more complex logic for identifying the specific conditions in which it is necessary to prevent the response action being performed, and instead simply any speculatively issued read request could be rejected if it targets a region of the speculation restricted region type. The processing circuitry may then issue a non-speculatively issued read request for the target memory region of the speculation-restricted region type once any speculation associated with the request has been resolved as correct. This approach can be simple to implement. However, it may result in the response action being prevented in cases when it would actually not have caused risk of speculation-side-channel attacks.

Other implementations could be more sophisticated by checking for the specific circumstances in which the response action may need to be prohibited (for example considering whether or not the speculation associated with the first read request has already been resolved, and/or whether an entry associated with the address of the target region of the speculation-restricted region type has already been allocated to the cache).

Unaligned memory accesses may be permitted for memory regions of the speculation-restricted region type. It is often most efficient to access a memory system based on aligned memory accesses where the address of the memory access is aligned to a block of data corresponding to a predetermined number of memory locations corresponding to an exact power of 2. However, software may generate read requests with unaligned memory accesses where the address of the memory access is not aligned exactly to a power of 2 address boundary. Some systems may support memory region types which prohibit unaligned memory accesses, for example because unaligned memory accesses may often be decomposed into a greater number of separate aligned memory accesses, which can create undesired effects when accessing memory regions assigned to certain peripheral devices for example. However, requiring all memory accesses to be aligned may impose greater complexity on the software being executed. With the speculation-restricted region type, as it may be irrelevant from the point of view of protecting against speculation-side-channel attacks whether addresses are aligned or unaligned, it may be preferred to permit unaligned memory accesses to memory regions of the speculation-restricted region type so as to avoid placing additional burden on software developers.

In some implementations, the cache of the processing circuitry may limit a maximum duration for which data corresponding to a memory region of a speculation-restricted region type can remain cached in the cache. For example, one way of limiting the duration may be to mark cache lines which relate to data from a speculation-restricted region in the cache (e.g. with a "speculation-restricted" flag or other indication specified in the metadata of the cache entry). When new data needs to be allocated to the cache and there is no invalid entry to which the new data can be allocated, a victim entry is selected from among a number of candidate entries (e.g. entries in a set of locations indexed based on the address of the new data). When selecting the victim entry, an entry marked as relating to data from a speculation-restricted region may be selected in preference to an entry not marked as relating to data from a speculation-restricted region. This will tend to ensure that the lifetime of the entry from the speculation-restricted region is relatively short (as the size of a level 1 cache may be relatively small, e.g. a few 10s of kilobytes). This is just one example of how to limit the duration for which the data from the speculation-restricted region can remain cached, and others are also possible. In general, by limiting a maximum duration for which data from a speculation-restricted type of memory region can be cached in the cache of the processing circuitry, this can reduce vulnerability to side-channel attacks as discussed above, because often such attacks may require a large number of different accesses to the cache to be performed for different addresses in order to probe exactly which addresses are still in the cache and hence which addresses may have been accessed based on secret information. By limiting the maximum duration for which speculatively loaded data corresponding to a memory region of the speculation-restricted region type can remain cached, this makes it harder for the attacker to deduce this information since towards the end of its run of accesses for probing cache timings the data which was originally speculatively-accessed may no longer be present.

Another source of requests to the memory system may be prefetch requests issued which request that data is brought into the cache which may be required in future, before there has been any instruction indicating that such data is required to be brought into the registers of the processing circuitry. If a prefetch request (which is by definition speculative) was made to a region containing sensitive information, then again allocation of this information into the cache could expose some information on a secret to an attacker.

Different classes of prefetcher can be provided. For example an address pattern based prefetcher may be trained based on previously accessed sequences of addresses, for example to detect whether the addresses include a stride pattern where a sequence of addresses at regular intervals is accessed, and if a stride is detected, the prefetcher may continue to issue prefetch requests for data at subsequent addresses in the stride sequence stretching beyond the current address reached non-speculatively by the system. The attacker could therefore issue a pattern of data access requests to addresses designed to train the prefetcher so that it will subsequently prefetch data from the sensitive location into the cache or fetch other addresses which depend on the secret. Another class of prefetcher may be a content based prefetcher, which analyses the data fetched by a memory access to identify possible pointers to other locations in memory. If some are found, the data can be fetched from the locations in memory pointed to by the pointers.

The use of a prefetcher to mount speculation-side-channel attacks could be mitigated against by prohibiting prefetch requests to regions of the speculation-restricted region type. Alternatively, in some systems, while prefetch requests may generally be prohibited for regions of the speculation-restricted region type, an exception may be made for cases when the memory region immediately preceding the region targeted by the prefetch request has already been cached non-speculatively in the cache, in which case a prefetch request to the next memory region may be permitted even if it is of the speculation-restricted region type. This would limit the ability of the prefetcher to prefetch far ahead of the current non-speculative point of execution reach, which reduces vulnerability to speculation-side-channel attacks. Nevertheless, prefetch requests to memory regions of a type other than the speculation-restricted region type could still be permitted to improve performance. This can provide a better balance between security and performance.

The prefetch requests discussed above could be either hardware prefetch requests generated by a hardware prefetcher independent of instructions executed by the processing circuitry, or a software prefetch request triggered by a software prefetch instruction executed by the processing circuitry. Hence, even explicit instructions which request prefetching of data (even though that data is not currently required to be loaded into the registers of the processing circuitry) could be prohibited for speculation-restricted regions of memory.

In some implementations, different levels of restriction could be applied for different types of prefetcher. For example, the address pattern based prefetcher may be harder for an attacker to exploit than the content based prefetcher discussed above, as it may be relatively easy to arrange for the processing circuitry to legitimately access a block of memory that has a security hole in it, and to arrange for that hole to contain the address of a location of interest which may then have its data prefetched by the content based prefetcher. Hence, in some cases prefetch requests targeting a speculation-restricted memory region type could be prohibited (or prohibited unless data from the targeted region is already in the cache) when they are generated by the content based prefetcher, but prefetch requests targeting a speculation-restricted memory region type could be less restricted when they are generated by the address pattern based prefetcher. For example, prefetch requests from the address pattern based prefetcher could still be permitted even when they target a speculation restricted type of memory region, although some restriction may still be applied relative to requests not targeting a speculation-restricted region, e.g. the prefetch request could be restricted to prefetching to an outer cache level (rather than to the level 1 cache), so that the data is available at much lower cost than if it had to be fetched from main memory, but without bringing it into the innermost (level 1) cache where it could be used freely for further speculation. Hence, in some cases the restriction applied to prefetch requests to a region of the speculation-restricted region type may vary depending on the class of prefetcher which generated the prefetch request.

The speculation-restricted region type may not be the only memory region type. The system may also support a device region type which can be indicated for regions of memory by the memory attribute data. For regions of the device region type, the memory access circuitry may prohibit subsequent read requests from being serviced using data obtained in response to the given read request. The device region type can be useful for regions of memory mapped to certain peripheral devices where it is desired that a separate transaction is issued to memory for every access to that peripheral device. For example this could be useful for peripheral devices which carry out certain real world actions in a system, such as the firing of airbags in an automotive vehicle. Speculative requests to a region of the device region type may often be prohibited altogether as often the effects of memory accesses to a peripheral device may be irreversible and so it may be desired that the peripheral is only ever accessed non-speculatively. While in existing systems the device region type could also be used for regions of memory for which speculation-side-channel attacks are deemed of risk and this would mitigate against the attack because speculative accesses to the device region type of memory could be denied, this would also greatly impact on performance when accessing such regions because for the device region type any subsequent read request would have to be serviced using an entirely separate memory transaction. Hence, by assigning a speculation-restricted region type which restricts the ability to service memory accesses in response to speculative requests, but nevertheless permits subsequent read requests (in cases where the data is returned in response to a first read request) to be serviced without needing to issue a separate transaction to memory, this enables greater performance than if the device region type was used to guard against the speculation-side-channel attacks.

Another type of memory region which may be provided may be a non-speculation-restricted region type (or normal region type), for which the memory access circuitry may determine whether the at least one response action is permitted independent of whether the read request is issued speculatively or non-speculatively. Hence, the non-speculation-restricted region could be used for most memory regions where the risk of speculation-side-channel attacks is low to improve performance by allowing full access to those regions in response to the speculatively issued read requests, but for those specific regions which are deemed at risk of attack the speculation-restricted region type could be used to improve security.

The memory attribute data could distinguish regions of the non-speculation-restricted region type and the speculation-restricted region type in different ways. In one example each memory region may have a corresponding type attribute which identifies the region type. The memory access circuitry may determine that a given region is of the non-speculation-restricted region type when the type attribute for the given memory region has a first value, and is of the speculation-restricted region type when the type attribute for the given memory region has a second value. Hence in this case the type attribute provided on the per-region basis may distinguish whether regions are of the non-speculation-restricted or speculation-restricted region type.

Alternatively, in other cases the memory access attribute data may include a type attribute specified for each memory region, but may also include a global attribute shared between multiple memory regions. With this approach when the type attribute for a given memory region has a predetermined value, the given memory region may be determined to be of the non-speculation restricted region type when the global attribute has a first value, and of the speculation-restricted region type when the global attribute has a second value. Hence, with this approach the non-speculation-restricted and speculation-restricted region types may share exactly the same predetermined value for the type attribute provided per memory region, but a separate globally defined attribute may be provided to indicate whether type attribute of that predetermined value should be interpreted as indicating the non-speculation-restricted or speculation-restricted region type as appropriate. For example the global attributes could be specified as a header parameter in the page tables providing the type attributes for each memory region, or could be specified within a control register of the data processing apparatus. Such a control register could be hardwired so as to be fixed for a given processor implementation, or could be programmable so that software may select whether regions for which the type attribute has the predetermined value should be treated as the non-speculation-restricted region type or the speculation-restricted region type. This approach using the global attribute can enable backwards compatibility with software written for systems not supporting the speculation-restricted region type, since the same page tables defining memory regions of the non-speculation-restricted region type can simply be reused unchanged, but with the global attribute updated to indicate that regions previously indicated as non-speculation restricted should now be interpreted as speculation-restricted.

The processing circuitry could use either in-order or out-of-order processing. In out-of-order processors, the speculation-restricted region type discussed above can be particularly useful because in an out-of-order processor the processor can speculatively execute instructions past a stalled instruction, leading to more risk of attacks of the form discussed above. However, also in some in-order processor designs, the memory access circuitry may treat accesses to the speculation-restricted region differently from accesses to the non-speculation-restricted region, in the same way as discussed above.

However, in an in-order processor there may be less risk of attack as the number of operations which can be speculatively executed past a branch prediction may be limited as when a memory access instruction stalls due to a cache miss then no further instructions can be executed until that memory access instruction has been serviced. Hence, in some implementations of an in-order processor, the added protection of the speculation-restricted region type may be considered unnecessary, as the risk of speculation-side channels may be sufficiently low. Therefore, to reduce complexity of the memory access circuitry (and improve performance by permitting actions for speculative read requests that would be permitted for non-speculatively read requests), the memory access circuitry could treat the speculation-restricted region type in the same way as the non-speculation-restricted region type (normal region type) discussed above. Nevertheless, the memory mapping data may still distinguish regions of the speculation-restricted region type and the non-speculation-restricted region type, so that the same program code can execute on out-of-order processors or on in-order processors which do treat speculative reads to the speculation-restricted region type differently with the at least one response action omitted as discussed above.

A method for memory allocation may be provided to exploit the speculation-restricted region types discussed above. The method may include allocating one or more regions of memory for use by a given software process, and for each allocated region selecting a selected region type from among a number of region types and storing memory attribute data identifying the selected region type for that region. For at least one region, the selected region type may be the speculation-restricted region type as discussed above. This method could be performed by any software for controlling the allocation of memory for use by other processes. For example the memory allocation method could be performed by an operating system or hypervisor. In some cases, the decision on whether to use the speculation-restricted region type for a given region may be based on the sensitivity of data to be stored in that region or the perceived sensitivity of the software for which the memory is being allocated as a whole. In some cases, the memory allocation process may be based on annotation data provided by a user indicating the expected level of sensitivity for particular accesses to be performed. The method may be controlled by a computer program executing on a host data processing apparatus. The host data processing apparatus could be the same processing apparatus which will then subsequently use the defined memory attribute data to control access to the memory system, or could be a different processing apparatus to the one whose memory accesses will be controlled based on the memory attribute data, with the memory attribute data generated by the memory allocation computer program executing on the host processing apparatus then subsequently being loaded into the target data processing apparatus which will actually execute code with the memory accesses controlled based on the memory attribute data. A storage medium may store the computer program, which could be a transitory storage medium or a non-transitory storage medium.

FIG. 1 schematically illustrates an example of a data processing apparatus 2 including a CPU (central processing unit) 3 having a processing pipeline comprising a number of pipeline stages. The pipeline includes a branch predictor 4 for predicting outcomes of branch instructions and generating a series of fetch addresses of instructions to be fetched. A fetch stage 6 fetches the instructions identified by the fetch addresses from an instruction cache 8. A decode stage 10 decodes the fetched instructions to generate control information for controlling the subsequent stages of the pipeline. A rename stage 12 performs register renaming to map architectural register specifiers identified by the instructions to physical register specifiers identifying registers 14 provided in hardware. Register renaming can be useful for supporting out-of-order execution as this can allow hazards between instructions specifying the same architectural register to be eliminated by mapping them to different physical registers in the hardware register file, to increase the likelihood that the instructions can be executed in a different order from their program order in which they were fetched from the cache 8, which can improve performance by allowing a later instruction to execute while an earlier instruction is waiting for an operand to become available. The ability to map architectural registers to different physical registers can also facilitate the rolling back of architectural state in the event of a branch misprediction. An issue stage 16 queues instructions awaiting execution until the required operands for processing those instructions are available in the registers 14. An execute stage 18 executes the instructions to carry out corresponding processing operations. A writeback stage 20 writes results of the executed instructions back to the registers 14.

The execute stage 18 may include a number of execution units such as a branch unit 21 for evaluating whether branch instructions have been correctly predicted, an ALU (arithmetic logic unit) 22 for performing arithmetic or logical operations, a floating-point unit 24 for performing operations using floating-point operands and a load/store unit 26 for performing load operations to load data from a memory system to the registers 14 or store operations to store data from the registers 14 to the memory system. In this example the memory system includes a level one instruction cache 8, a level one data cache 30, a level two cache 32 which is shared between data and instructions, and main memory 34, but it will be appreciated that this is just one example of a possible memory hierarchy and other implementations can have further levels of cache or a different arrangement.

Access to memory may be controlled using a memory management unit (MMU) 35 for controlling address translation and/or memory protection. The load/store unit 26 may use a translation lookaside buffer 36 of the MMU 35 to map virtual addresses generated by the pipeline to physical addresses identifying locations within the memory system. The CPU 3 interacts with the memory 34 via an interconnect 37 which manages coherency between data in the caches 30, 32, 8 of the CPU 3 and data in a remote cache 40 within another master device (e.g. a graphics processing unit) 38. It will be appreciated that the pipeline shown in FIG. 1 is just one example and other examples may have different sets of pipeline stages or execution units. For example, an in-order processor may not have a rename stage 12.

As shown in FIG. 1, the CPU 3 also includes a hardware prefetcher 44 for predicting addresses of future memory accesses before they have been explicitly indicated by the instructions processed in the pipeline. The prefetcher 44 issues prefetch requests requesting that data is fetched from memory according to the predicted addresses and allocated into the L1 cache 30. For example, the prefetcher 44 may be supplied with the sequence of addresses looked up in the TLB 36 or supplied by the load/store unit 26, and may detect whether a stride pattern of addresses with regular offsets between successive addresses is detected. When such a stride pattern is detected, the prefetcher 44 can trigger additional memory access requests to be issued to the memory system for data associated with addresses which extend beyond the most recent data address reached by the load/store unit 26, in intervals of the predicted address stride. When the actual pattern of addresses is detected to no longer follow the stride pattern then such prefetching can be halted until another stride pattern is detected. Alternatively, the prefetcher 44 could be a content-based prefetcher which predicts whether the data loaded by a given memory access is a pointer to a further location in memory, and if the data is predicted to be a pointer, prefetches the data from the further location identified by the pointer. In some cases, the pipeline may also execute software prefetch instructions which request that data from a given address is brought into the L1 cache 30 without being loaded into the register bank 14 (unlike regular load instructions which require the data to be loaded into a target register).

Speculation-based cache timing side-channels using speculative memory reads have recently been proposed. Speculative memory reads are typical of advanced microprocessors and part of the overall functionality which enables very high performance. By performing speculative memory reads to cacheable locations beyond an architecturally unresolved branch (or other change in program flow), and, further, using the result of those reads themselves to form the addresses of further speculative memory reads, these speculative reads cause allocations of entries into the cache whose addresses are indicative of the values of the first speculative read. This becomes an exploitable side-channel if untrusted code is able to control the speculation in such a way it causes a first speculative read of location which would not otherwise be accessible at that untrusted code, but the effects of the second speculative allocation within the caches can be measured by that untrusted code.

For any form of supervisory software, it is common for untrusted software to pass a data value to be used as an offset into an array or similar structure that will be accessed by the trusted software. For example, an application (untrusted) may ask for information about an open file, based on the file descriptor ID. Of course, the supervisory software will check that the offset is within a suitable range before its use, so the software for such a paradigm could be written in the form:

```
1 struct array {
2 unsigned long length;
3 unsigned char data[ ];
4 };
5 struct array*arr= . . . ;
6 unsigned long untrusted_offset_from_user= . . . ;
7 if (untrusted_offset_from_user<arr→length) {
8 unsigned char value;
9 value=arr→data[untrusted_offset_from_user];
10 . . .
11 }
```

In a modern micro-processor, the processor implementation commonly might perform the data access (implied by line 9 in the code above) speculatively to establish value before executing the branch that is associated with the untrusted_offset_from_user range check (implied by line 7). A processor running this code at a supervisory level (such as an OS Kernel or Hypervisor) can speculatively load from anywhere in Normal memory accessible to that supervisory level, determined by an out-of-range value for the untrusted_offset_from_user passed by the untrusted software. This is not a problem architecturally, as if the speculation is incorrect, then the value loaded will be discarded by the hardware (reversing effects on the register bank 14 caused by the speculation).

However, advanced processors can use the values that have been speculatively loaded for further speculation. It is this further speculation that is exploited by the speculation-based cache timing side-channels. For example, the previous example might be extended to be of the following form:

```
1 struct array {
2 unsigned long length;
3 unsigned char data[ ];
4 };
5 struct array*arr1= . . . ; /*small array*/
6 struct array*arr2= . . . ; /*array of size 0x400*/
7 unsigned long untrusted_offset_from_user= . . . ;
8 if (untrusted_offset_from_user<arr1→length) {
9 unsigned char value;
10 value=arr1→data[untrusted_offset_from_user];
11 unsigned long index2=((value&1)*0x100)+0x200;
12 if (index2<arr2→length) {
13 unsigned char value2=arr2→data[Index2];
14 }
15 }
```

In this example, "value", which is loaded from memory using an address calculated from arr1→data combined with the untrusted_offset_from user (line 10), is then used as the basis of a further memory access (line13). Therefore, the speculative load of value2 comes from an address that is derived from the data speculatively loaded for value. If the speculative load of value2 by the processor causes an allocation into the cache, then part of the address of that load can be inferred using standard cache timing side-channels. Since that address depends on data in value, then part of the data of value can be inferred using the side-channel. By applying this approach to different bits of "value", (in a number of speculative executions) the entirety of the data of value can be determined. Hence, the untrusted software can, by providing out-of-range quantities for untrusted_offset_from_user, access anywhere accessible to the supervisory software, and as such, this approach can be used by untrusted software to recover the value of any memory accessible by the supervisory software.

Modern processors have multiple different types of caching, including instruction caches, data caches and branch prediction cache. Where the allocation of entries in these caches is determined by the value of any part of some data that has been loaded based on untrusted input, then in principle this side channel could be stimulated.

As a generalization of this mechanism, it should be appreciated that the underlying hardware techniques mean that code past a branch might be speculatively executed, and so any sequence accessing memory after a branch may be executed speculatively. In such speculation, where one value speculatively loaded is then used to construct an address for a second load or indirect branch that can also be performed speculatively, that second load or indirect branch can leave an indication of the value loaded by the first speculative load in a way that could be read using a timing analysis of the cache by code that would otherwise not be able to read that value. This generalization implies that many code sequences commonly generated will leak information into the pattern of cache allocations that could be read by other, less privileged software. The most severe form of this issue is that described earlier in this section, where the less privileged software is able to select what values are leaked in this way.

In the examples described below, counter-measures against this type of attack are provided by defining a new type of memory region called a "speculation-restricted-type" of memory region for which the MMU 35 ensures that the processor restricts the ability of speculatively issued requests to interact with the memory system to provide some mitigation against speculation-side-channel attacks.

Figures 2, 3, 4:
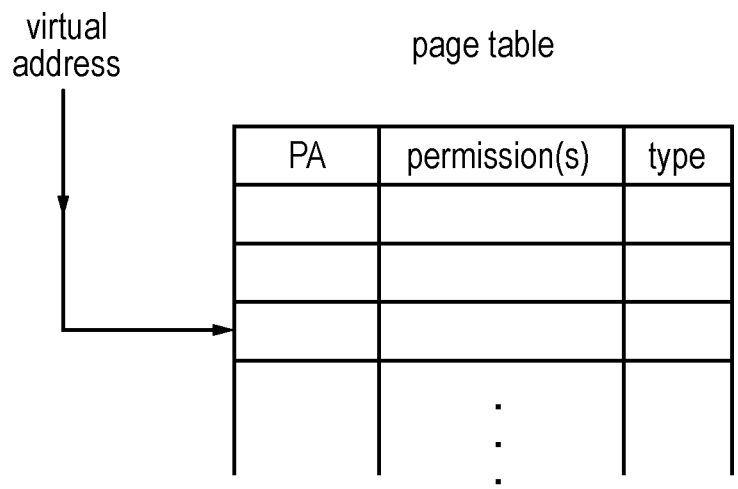
FIG. 2 shows an example of memory attributes set for memory regions including an indication of a region type of each memory region.
FIGS. 3 and 4 show alternative ways of representing the memory region type.

FIG. 2 shows an example of looking up page tables based on a required virtual address of data to be accessed. The page table includes a number of entries each corresponding to a certain block of virtual addresses and specifying a corresponding physical address for that block, one or more access permissions (such as whether reads and/or writes are permitted to that memory region, and in some cases which privilege levels are allowed to access that memory region), and an indication of the type of memory region, which is specified from a number of alternative region types as discussed below.

It will be appreciated that FIG. 2 shows an example of looking up the page table at a schematic level, and in practice the actual lookup process for the page tables may be more complex. For example, some systems may support two stages of address translation, a first stage from the virtual address to an intermediate physical address under control of a first set of page tables set by the operating system, and a second stage from the intermediate physical address to physical address under control of a second set of page tables controlled by a hypervisor. This can be useful for supporting virtualisation where multiple guest operating systems coexist on the same platform and are mapped by the hypervisor onto different regions of the physical address space even though the operating systems may from their point of view perceive that they are using physical addresses (which may conflict), but which from the point of view of the hypervisor are actually intermediate physical addresses which are mapped to separate physical addresses by the hypervisor. Also, even within one set of page tables, such as either the stage one or stage two page tables discussed above or a unified page table which provides a complete translation from virtual to physical address, the page table may be implemented using a number of levels of page table where different subsets of bits from the virtual address select entries within different levels of the page table structure during a page table walk, so as to eventually locate the page table entry providing the actual physical address for the required block of memory. Such hierarchical page table structures can be more efficient in their use of memory as they mean that it is not necessary to reserve a region of memory proportionate to the size of the overall address range across which address translations can be represented in order to store the page table itself. Any known address translation technique can be used.

The region type indicated in each page table entry according to such known techniques can be expanded to include an indication of the speculation-restricted type of region as discussed below. While FIG. 2 shows indexing into a page table, selected entries from the page table may be cached in the translation lookaside buffer 36 for faster access by the MMU 35, so that it is not necessary to access the page tables in the memory 34 each time an address translation is required.

FIGS. 3 and 4 show two alternative ways of representing the region type in the page tables. In the example of FIG. 3 a region type field is provided for each page table entry indicating one of a number of region types for the corresponding block of addresses. A number of different values are allocated to different types of memory region. For example, in FIG. 3, the type field provides a 2-bit encoding for which three of the values are allocated to indicate normal (non-speculation-restricted), device, and speculation-restricted memory region types respectively. The fourth encoding of the type field is reserved. It will be appreciated that the particular values of the type field allocated to each of the respective memory types is an arbitrary selection, and other embodiments could swap which region type is indicated by a particular encoding of the type field. It will be appreciated that some systems could support more than three different region types.

As shown in FIG. 4, in an alternative approach the type field may only comprise a single bit which is set to a predetermined value (e.g. 0) when the region type is either normal or speculation-restricted, and in which is set to 1 when the region type is device type. In this case a separate global memory attribute 50 may be defined which is shared between multiple memory regions, rather than being specified for each separate memory region in the page tables. For example a global attribute 50 could be specified within a control register in the register bank 14, or could be stored in the memory system within attribute data which is global to the entire address space or to a specific portion of the address space. This approach can be better for backwards compatibility since many existing pieces of code may have been written assuming that the only region types available are normal and device, and in this case the global attribute 50 can be used to modify whether some of those regions previously treated as being of the normal type of region should instead be treated as speculation-restricted.

FIG. 5 shows a table indicating various properties of the normal, speculation-restricted and device type memory regions respectively. In the case of the speculation-restricted type of region, the behaviour differs depending on whether a read request to a region indicated as being of the speculation-restricted type is issued speculatively or non-speculatively. FIG. 5 has columns illustrating the behaviour in the non-speculative case and the case when the request is issued speculatively but has not yet been resolved as correct. It will be appreciated that there may also be a case where a request was issued speculatively, and eventually is resolved as correct. Once a speculative read request has already been resolved as correct, then some implementations may treat this the same as the non-speculative case. Other implementations may simplify the memory access control by treating all speculative read requests to a speculation-restricted region in the same manner as for unresolved speculative requests, even after the speculative request has been resolved. Hence, it will be appreciated that it is implementation-dependent whether already resolved speculative requests to a speculation-restricted region should follow the behaviour shown in the speculative case or the non-speculative case as shown in FIG. 5.

Similarly, the behaviour shown for the device type of region differs between speculatively issued requests and non-speculatively issued requests to the device type region, but in this case there is no difference depending on whether speculative requests have already been resolved as correct or not.

It will be appreciated that a speculatively issued request may be any read request issued to the memory system or cache by the load/store unit 26 which the processing pipeline has not yet determined has been correctly issued. For example this may be the result of a branch prediction by the branch predictor 4 so that a subsequent instruction after the branch triggers a read request to the memory system when it has not yet been determined whether the branch was correctly predicted.

As shown in FIG. 5, for requests issued to a memory region of the normal type, the read requests can be serviced in the same manner regardless of whether they are issued speculatively or non-speculatively. Hence, for a request to a normal region the system is allowed to issue read transactions to the memory system 30, 32, 34, 37 in response to the read request, is allowed to return data obtained from the memory system to the processor 3 so that data can be stored in the registers 14 in response to the read request, and is allowed to allocate the returned data into the L1 cache 30 of the processor core 3.

In addition, read requests targeting a memory region indicated by the page tables as normal type are allowed to trigger changes in address allocation in remote caches 40 in another master device 38 other than the master 3 executing the instruction which triggered the read request, and could also cause unopened DRAM (dynamic random access memory) pages to be opened when a request is issued to a DRAM device within the memory 34. In a DRAM chip, the DRAM often includes a row buffer which can be used to store all the data read out from a single row of the memory array. When a data value is accessed from any cell within the same row, all the row of cells would be read out to the row buffer. Hence, a subsequent request to an address within the same row can be serviced faster than a request to an address in another row of the DRAM array, and so often it can be most efficient to group memory accesses into addresses within a same row if possible. Hence, the opening of an unopened DRAM page refers to an occasion when an address is accessed from a different row to the one currently stored within the row buffer, so that it is necessary to write back the values from the row buffer associated with the previously opened page into the corresponding row of cells in the DRAM structure and then read out a different row of cells into the row buffer. Such operations may be allowed for both speculative and non-speculatively issued requests targeting a region of the normal type.

Another property of normal type accesses may be that once one read request has been serviced, the data from the normal type of region read in response to that request may be allowed to be used for servicing a subsequent read request to the same address or a nearby address. For example, in some cases even if only a small part of a block of data returned by the memory is required for handling one read request, the rest of that block may nevertheless be cached within the L1 data cache 30 and later a subsequent request may hit against one of the subsequent parts of the same block and so may be serviced without needing an extra memory transaction to be issued to the memory system. This is allowed in response to requests targeting a region of the normal type.

Prefetch requests issued by the prefetcher 44 may be allowed to memory regions of the normal type. Also, software prefetch requests triggered by software prefetch instructions executed in the pipeline may also be allowed. Also, there may be no limit to the duration for which data from a normal region is cached within the L1 cache 30 of the CPU 3 (other than any time durations imposed by the limited amount of cache space available so that eventually the cache data may need to be evicted to make room for more recently accessed data).

Note that while the "Normal" memory type shown in the example of FIGS. 3-5 is shown as a single memory type, some implementations may support multiple versions of the "Normal" type which have different behaviours. For example, "Write Through" and "Write Back" variants of "Normal" may be defined which have the properties shown in FIG. 5, but where writes to a "Write Through" region cause data to be updated in both the cache and main memory, while writes to a "Write Back" region cause an update in the cache only and the writeback to main memory is deferred until the cached data is evicted from the cache. Therefore, some systems may support multiple "Normal" mapping types. Similarly, multiple variants of "Speculation-Restricted" memory type, or multiple variants of "Device" memory type, could be supported, where generally the properties of FIG. 5 are satisfied by each of the variants, but other properties differ depending on the particular variant assigned to a given memory region.

The device type of memory may be designed for regions of memory that are mapped to certain peripheral devices connected to the interconnect 37. Speculatively issued requests to a region marked by the MMU 35 as being of the device type may always be rejected by the MMU 35 so that it is not possible to access a device type region speculatively. This may be useful for ensuring certain irreversible actions associated with peripherals, such as setting off physical changes such as release of a passenger airbag in a vehicle, triggering a sprinkler system for fire safety in a building, etc. are only triggered when it is known that this is the correct behaviour once such requests have become non-speculative. Hence, as shown in FIG. 5 if a speculatively issued request targets the device type region then no read transaction is issued to the memory system, which also implies that no data is returned to the processor and no data read in response to the request is allocated into the level 1 cache 30. In addition there are no changes in address allocation in remote caches 40 and no unopened DRAM page can be caused to be opened. Also, in response to a request targeting the device type of region, even for non-speculative requests, subsequent read requests are not allowed to be serviced using data obtained in response to the first read request. This recognises that for many peripherals it may be important that when the processor instructs an interaction with that peripheral that this action takes place each time the processor instructs the action, which may be done through a read or write memory access to the memory address in the region marked as device type, and so it is undesirable to allow subsequent access requests to a nearby address to be serviced using the data returned in response to a previous address request for the same region. Also, prefetch requests may not be allowed for the device type regions as again this is a form of speculation.

One possible way of mitigating against the type of speculative-side-channel attack discussed above may be to mark regions of the memory address space which could potentially be prone to such attacks as the device type of region, which would prevent the attacks by denying the ability to speculatively access such memory regions. In this case, any malicious training of the branch predictor 4 or other activity of the attacker designed to induce incorrect execution of instructions following a speculation could not result in data from the device type region being accessed inappropriately by the attacker since any speculation would be resolved before those regions can be accessed. However, as device type regions are required to service each read request to the device region with a separate transaction, preventing any subsequent read requests being serviced using data obtained in response to a first read request, designating regions of memory as device type merely as a precaution against side-channel attacks could result in a loss of performance.

The speculation-restricted type of region shown in FIG. 5 provides a different set of properties which still restricts the ability to speculatively issue reads to the region in a similar way to the device type but is less restrictive then a device type region in some respects, and which does allow a subsequent read request to be serviced using data obtained in response to a first read request, in a similar way to the normal type of region. Hence, the speculation-restricted type of memory region would provide a better balance between security and performance than either the normal or device type regions can provide.

When a read request is issued non-speculatively to a speculation-restricted type of region, then this is handled similar to a non-speculative or speculative read request issued for a memory region marked as the normal type, with the exception that prefetch requests can never be non-speculative and so these are not relevant to non-speculatively issued requests to the speculation-restricted memory region. In addition, in some implementations there may be optionally be an additional restriction on all requests targeting speculation-restricted type of regions in that the duration for which data from a speculation-restricted type of region may be cached within the L1 data cache 30 may be limited to some maximum duration. This can help to restrict the scope for side-channel attacks by limiting the period for which the attacker is able to derive information about an address accessed in a previous speculative data access to a certain maximum duration. The duration for which data can remain pending in the cache may be tracked in different ways, for example by using a counter associated with a cache entry which may be decremented or incremented in response to each lapsed processing cycle, each memory access, or each allocation of a new entry in the cache, and then may trigger the previously allocated data from the speculation-restricted region to be evicted from the cache when a certain threshold is reached.

On the other hand, for speculatively issued memory access requests which have not yet been resolved as correct, when the request targets a region marked as speculation-restricted, then at least one of the actions which would be permitted for normal access requests or for non-speculative access requests to a speculation-restricted region may not be permitted. For example, any one or more of: issuing the read transaction to the memory system, returning data obtained from memory to the processor and/or allocating read data to the L1 data cache 30 may be prohibited for speculatively issued read requests which target a region of the speculation-restricted type. Alternatively, these actions may not be permitted when there is not yet an existing entry in the L1 data cache 30 for the target address in the region marked as speculation-restricted, but may still be permitted if there is already in an entry in the L1 data cache 30 for that target address. This may reflect that once data has been allocated to the L1 data cache 30 for a given address then it means this address has already been accessed legitimately once and so it is unlikely the address represents sensitive information not accessible to the currently executing process, and so it may be acceptable to access that address again in response to the speculatively issued read request even if the address is from a region marked as the speculation-restricted type.

In addition, regardless of whether the target address is already cached in the L1 data cache 30, for a speculatively issued read request to a speculation-restricted region which has not yet been resolved as correct by the execute stage 18, changes in address allocation in remote caches 40 may be prohibited and also unopened DRAM pages may be prevented from being opened within the memory 34. In some cases this may simply be enforced by preventing the issue of the read transaction to memory system at all as indicated in the first line of the table in FIG. 5, or alternatively by issuing a form of read transaction which has properties such that it will ensure that it is only acted upon if it can be done without changing the address allocation pattern in the remote cache 40 or without causing the unopened DRAM page to be opened.

Prefetch requests issued by the prefetcher 44 or in response to the software prefetch instructions may be prohibited if they target a speculation-restricted region. Alternatively they could be allowed only when data corresponding to the immediately preceding memory region has already been cached non-speculatively in the L1 data cache 30. In some examples, if multiple types of prefetcher 44 are provided (e.g. an address pattern based prefetcher and a content based prefetcher), prefetch requests to a speculation-restricted region generated by one type of prefetcher (e.g. the content based prefetcher) may be more restricted than prefetch requests to a speculation-restricted region generated by another type of prefetcher (e.g. the address pattern based prefetcher).

Regardless of whether a read request to a speculation-restricted type of memory region is issued speculatively or non-speculatively, in cases where data is returned to the processor 3 in response to a read request to the speculation-restricted memory region, subsequent read requests may be allowed to be serviced using that data, in contrast to the device region. Hence, the speculation-restricted memory region type is much less harmful to performance, but nevertheless has some restrictions on speculation which help to guard against the attack described above.

It will be appreciated that it is not essential for all of the properties shown in FIG. 5 to be implemented for the speculation-restricted type. In general, the speculation-restricted memory region may provide a new memory class with some or all of the following characteristics:

accesses to the memory are not returned when the CPU is executing speculatively;

accesses to the memory are not returned when the CPU is executing speculatively, unless the data is already in the L1 cache;

accesses to memory when executing speculatively do not change the contents of any cache on the local or remote CPUs;

accesses to the memory when executing speculatively do not cause a DRAM page (or other similar memory structure) to be opened if it was not previously open;

the memory can be held in the cache once accessed for the first time;

unaligned accesses may be permitted (if any restrictions apply, these are the same system-level restrictions that apply to requests targeting the Normal region type);

the memory has non-temporal access properties, or similar, to ensure that it does not persist in the cache for extended periods of time (duration of caching limited).

prefetch operations to the memory are ignored, or very limited (even for explicit prefetch instructions);

prefetch operations can only happen if the previous line in the cache has already been accessed non-speculatively.

The above discussion of FIG. 5 has been in the context of read requests. In some cases, write requests requesting that data is written to a speculation-restricted region of memory may be handled in the same way as writes to normal regions. In general, the risk of speculation side-channel attacks may be greater for reads than writes, so in some systems it may be acceptable to apply to restrictions on speculation to reads only for requests targeting a speculation-restricted region. Alternatively, for consistent control write to the speculation-restricted request could be handled in the same way as reads.

Figure 6:
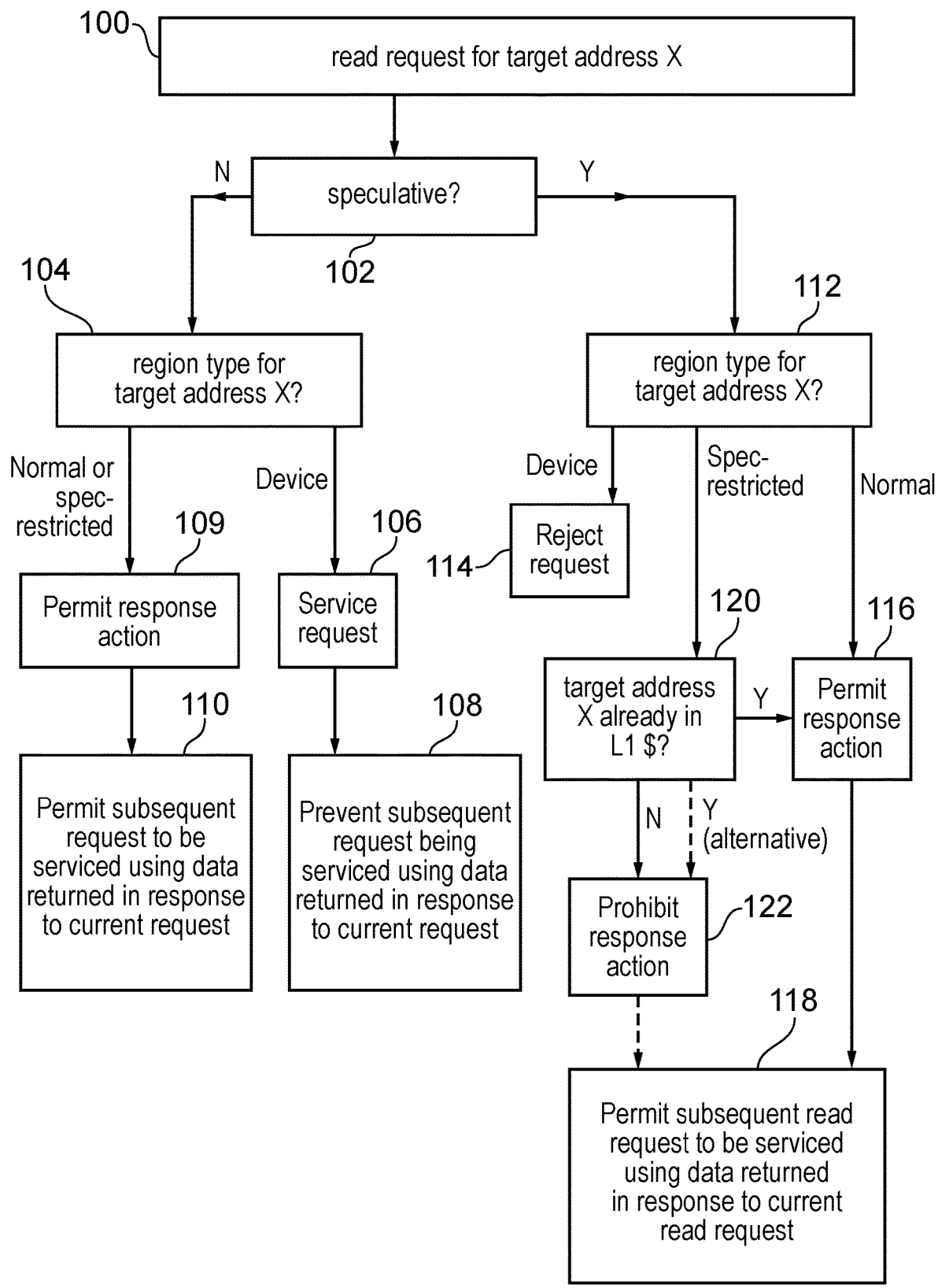
FIG. 6 is a flow diagram showing a method for controlling access to memory based on the region types.

FIG. 6 is a flow diagram illustrating a method of controlling memory access. For example this method may be performed by the load/store unit 26 or by the MMU 35, or by both elements in combination. At step 100 a read request is received for a given target address X. At step 102 it is detected whether the read request has been issued speculatively. If the request is non-speculative, at step 104 the MMU 35 determines the region type for the region including target address X. If the region type is device type then at step 106 the request is serviced since it is a non-speculative request which is allowed to access device memory, but at step 108 any subsequent request is prevented from being serviced using the data returned in response to the current request. Hence, to access the device type memory again, a separate read transaction would be needed.

Alternatively, if at step 104 the region type is either the normal type of region or the speculation-restricted type of region, then at step 109 at least one response action is permitted, which could be any of the actions shown in rows 1 to 5 of FIG. 5, and at step 110 a subsequent request is allowed to be serviced using the data returned in response to the current request.

On the other hand, if at step 102 it was detected that the request was issued speculatively then at step 112 again the region type for the region including target address X is determined. If the region type for the relevant region is device type then at step 114 the request is simply rejected as speculative accesses to device type memory are not allowed. If the region type is normal then at step 116 the response actions shown in rows 1 to 5 of FIG. 5 are allowed if required, and at step 118 again a subsequent read request is permitted to be serviced using data returned in response to the current read.

If at step 112 it is determined that the region type for target address X is the speculation-restricted type, then at step 120 the load/store unit 26 may check whether an entry for a target address X is already present within the level 1 data cache 30 and is valid, and if so then at step 116 the response action again may be permitted followed by step 118 in the same way as for normal requests. If the target address X does not already have an entry allocated in the level 1 cache then this means that storage of the data from address X in the cache would require allocation of a new entry which could trigger eviction of an entry associated with a different address which could be detected through cache timing side-channels by the attacker and so could risk exposing information about secret data. Therefore in this case at step 122 the load/store unit 26 prohibits at least one of the response actions shown in rows 1 to 5 of FIG. 5. In an alternative implementation, step 120 could be omitted, and in this case any speculative accesses to a memory region marked as speculation-restricted could always lead to step 122, not step 116. Depending on which of the response actions are prohibited for speculative accesses to the speculation-restricted type of region at step 122, in some cases it may be possible that data is still returned to the processor. In this case, at step 118 it would still be allowed to permit subsequent read requests to be serviced using the data in response to the current read request. For example in cases where a load/store buffer is provided for retaining previously loaded values for a number of cycles then it may be possible to service subsequent loads to a corresponding cache line without needing another memory transaction to be issued.

It will be appreciated that in practice handling of read requests may also require additional steps of checking memory access permissions which are not shown in FIG. 6 for conciseness.

Figure 7:
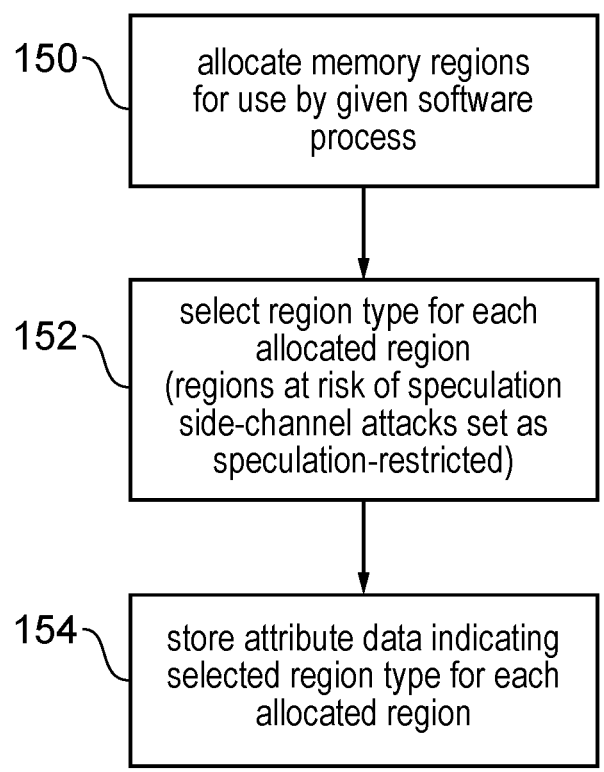
FIG. 7 is a flow diagram illustrating a method for memory allocation.

FIG. 7 shows a method for memory allocation which may be performed by software responsible for setting the memory access permissions and memory types for regions being allocated for use by a given software process. For example this method could be performed by an operating system when allocating memory for use by applications managed by the operating system, or by a hypervisor when allocating memory for use by operating systems executing under the hypervisor. At step 150 the supervising process allocates one or more memory regions for use by the given software process which it controls. At step 152, for each of the allocated regions, the supervising process selects the region type to be designated for that region. Regions at risk of speculation side-channel attacks can be set as the speculation-restricted region type which as discussed above will tend to protect such regions against exposure of information through cache timing side channels without harming performance as much as would be the case if these regions were marked as device type. For example, the software allocating the memory could have access to annotations indicating which areas may be likely to be used for secret data which needs to be protected and could select the speculation-restricted type of region as appropriate. Alternatively, in some cases if software in general is considered sensitive then it may be preferred to mark all of the allocated regions other than device type regions as the speculation-restricted type instead of the normal type. It will be appreciated that exactly which region should be marked as speculation-restricted may depend on the particular application for which the memory is being allocated. In general, providing the architectural and micro-architectural support for a speculation-restricted region type, which is distinguished from the normal and device types in the ways discussed above, can be very useful for improving security.

At step 154 of FIG. 7, the memory allocating software stores attribute data which indicates the selected region type for each allocated region. As shown in FIG. 3 this could comprise a type field specified within each page table entry of the page tables defining the memory attributes for the allocated regions, or as shown in FIG. 4 this attribute data could, in addition to a per-region-defined type field, also include a global attribute 50 which controls how the type field is interpreted.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
processing circuitry capable of speculatively issuing a read request to request that data is read from a target memory region of a memory system; and
memory access circuitry to control access to the memory system based on memory attribute data identifying each memory region as one of a plurality of region types, in which:
in response to a first read request for which the target memory region is indicated as a speculation-restricted region type by the memory attribute data:
at least when the first read request is non-speculatively issued by the processing circuitry, the memory access circuitry is configured to permit a subsequent read request to be serviced using data obtained in response to the first read request; and
when the first read request is speculatively issued by the processing circuitry, in response to the memory access circuitry determining that the first read request satisfied a predetermined condition, the memory access circuitry is configured to prohibit at least one response action, which is permitted for non-speculatively issued read requests specifying a target memory region of the speculation-restricted region type and which would be performed subsequent to determination that the storage of data would require allocation of the new entry in the cache, from being performed before the processing circuitry has resolved whether the first read request is correct,
wherein said predetermined condition is satisfied at least when the first read request is speculatively issued and storage of data corresponding to the target memory region in a cache of the processing circuitry would require allocation of a new entry in the cache.

2. The apparatus according to claim 1, in which said at least one response action comprises an action having potential to cause an effect which is detectable through measuring cache access timings or memory system access timings.

3. The apparatus according to claim 1, in which said at least one response action comprises issuing a read transaction to the memory system in response to the first read request from the processing circuitry.

4. The apparatus according to claim 1, in which said at least one response action comprises returning data obtained from the memory system in response to the read request to the processing circuitry.

5. The apparatus according to claim 1, in which said at least one response action comprises allocating a new entry in said cache for storing data corresponding to the target memory region.

6. The apparatus according to claim 1, in which when the first read request is speculatively issued by the processing circuitry and prior to issue of the first read request an entry has already been allocated in said cache for storing data corresponding to the target memory region, the memory access circuitry is configured to prohibit said at least one response action from being performed before the processing circuitry has resolved whether the first read request is correct.

7. The apparatus according to claim 1, in which when the first read request is speculatively issued by the processing circuitry and prior to issue of the first read request an entry has already been allocated in said cache for storing data corresponding to the target memory region, the memory access circuitry is configured to allow said at least one response action to be performed before the processing circuitry has resolved whether the first read request is correct.

8. The apparatus according to claim 1, in which said at least one response action comprises triggering a change in which addresses have data allocated in at least one remote cache of a master device other than the processing circuitry.

9. The apparatus according to claim 1, in which said at least one response action comprises causing an unopened DRAM page of the memory system to be opened.

10. The apparatus according to claim 1, in which said cache comprises a level 1 cache of the processing circuitry.

11. The apparatus according to claim 1, in which:
when the first read request is speculatively issued by the processing circuitry, at least when storage of data corresponding to the target memory region in the cache would require allocation of a new entry in the cache, the memory access circuitry is configured to prohibit said at least one response action being performed in response to the first read request even when the processing circuitry has already resolved that the first read request is correct.

12. The apparatus according to claim 1, in which the memory access circuitry is configured to reject speculatively issued read requests for which the target memory region is of the speculation-restricted region type.

13. The apparatus according to claim 1, in which the memory access circuitry is configured to permit unaligned memory accesses to a memory region of the speculation-restricted region type.

14. The apparatus according to claim 1, in which the cache of the processing circuitry is configured to limit a maximum duration for which data corresponding to a memory region of the speculation-restricted region type can remain cached in the cache.

15. The apparatus according to claim 1, in which the memory access circuitry is configured to prohibit a prefetch request to prefetch data from a memory region of the speculation-restricted region type into the cache.

16. The apparatus according to claim 1, in which the memory access circuitry is configured to prohibit a prefetch request to prefetch data from a given memory region of the speculation-restricted region type into the cache unless data corresponding to a previous memory region immediately preceding the given memory region in a memory address space is already non-speculatively cached in the cache.

17. The apparatus according to claim 15, in which said prefetch request comprises one of:
   a hardware prefetch request generated by a hardware prefetcher independent of instructions executed by the processing circuitry; and
   a software prefetch request triggered by a software prefetch instruction executed by the processing circuitry.

18. The apparatus according to claim 1, in which in response to a given read request for which the target memory region is indicated as a device region type by the memory attribute data, the memory access circuitry is configured to prohibit a subsequent read request from being serviced using data obtained in response to the given read request.

19. The apparatus according to claim 1, in which in response to a read request for which the target memory region is indicated as a non-speculation-restricted region type by the memory attribute data, the memory access circuitry is configured to determine whether said at least one response action is permitted independent of whether the read request is issued speculatively or non-speculatively.

20. The apparatus according to claim 19, in which the memory access attribute data comprises a type attribute specified for each memory region, and the memory access circuitry is configured to determine that a given memory region is of:
   the non-speculation-restricted region type when the type attribute for the given memory region has a first value; and
   the speculation-restricted region type when the type attribute for the given memory region has a second value.

21. The apparatus according to claim 19, in which the memory access attribute data comprises a type attribute specified for each memory region, and a global attribute shared between a plurality of memory regions; and
   when the type attribute for a given memory region has a predetermined value, the memory access circuitry is configured to determine that the given memory region is of:
      the non-speculation-restricted region type when the global attribute has a first value; and
      the speculation-restricted region type when the global attribute has a second value.

22. A method for a data processing apparatus comprising processing circuitry capable of speculatively issuing a read request to request that data is read from a target memory region of a memory system, the method comprising:
   controlling access to the memory system based on memory attribute data identifying each memory region as one of a plurality of region types; and
   in response to a first read request for which the target memory region is indicated as a speculation-restricted region type by the memory attribute data:
      at least in response to the first read request being non-speculatively issued by the processing circuitry, permitting a subsequent read request to be serviced using data obtained in response to the first read request; and
      at least in response to the first read request being speculatively issued by the processing circuitry and in response to the memory access circuitry determining that the first read request satisfied a predetermined condition, prohibiting at least one response action, which is permitted for non-speculatively issued read requests specifying a target memory region of the speculation-restricted region type and which would be performed subsequent to determination that the storage of data would require allocation of the new entry in the cache, from being performed before the processing circuitry has resolved whether the first read request is correct,
   wherein said predetermined condition is satisfied at least when the first read request is speculatively issued and storage of data corresponding to the target memory region in a cache of the processing circuitry would require allocation of a new entry in the cache.

23. A method for memory allocation for a data processing apparatus, comprising:
   allocating one or more regions of memory for use by a given software process; and
   for each allocated region, selecting a selected region type from among a plurality of region types, and storing memory attribute data identifying the selected region type, in which:
   for at least one region, the selected region type comprises a speculation-restricted region type indicating that, in response to a first read request requesting that data is read from said at least one region, the data processing apparatus is to:
      at least in response to the first read request being non-speculatively issued by the data processing apparatus, permit a subsequent read request to be serviced using data obtained in response to the first read request; and
      at least in response to the first read request being speculatively issued by the data processing apparatus and in response to the memory access circuitry determining that the first read request satisfied a predetermined condition, prohibit at least one response action from being performed before the data processing apparatus has resolved whether the first read request is correct, where said at least one response action is permitted for non-speculatively issued read requests specifying a target memory region of the speculation-restricted region type and which would be performed subsequent to determination that the storage of data would require allocation of the new entry in the cache,
   wherein said predetermined condition is satisfied at least when the first read request is speculatively issued and storage of data corresponding to the target memory region in a cache of the processing circuitry would require allocation of a new entry in the cache.

24. A non-transitory storage medium storing a computer program for controlling a host processing apparatus to perform the method of claim 23.

* * * * *